United States Patent
Zhao et al.

(10) Patent No.: US 12,099,038 B1
(45) Date of Patent: Sep. 24, 2024

(54) TEST SYSTEM AND METHOD FOR ANCHORING PERFORMANCE OF FULL-SIZE ROCK MASS ANCHOR BOLT UNDER COMBINED LOAD

(71) Applicant: SHANDONG UNIVERSITY OF SCIENCE AND TECHNOLOGY, Qingdao (CN)

(72) Inventors: Tongbin Zhao, Qingdao (CN); Minglu Xing, Qingdao (CN); Chunlin Li, Qingdao (CN); Yanchun Yin, Qingdao (CN); Bin Liu, Qingdao (CN); Fenghai Yu, Qingdao (CN); Wenli Liu, Qingdao (CN); Yubao Zhang, Qingdao (CN); Weiyao Guo, Qingdao (CN); Yaxin Liu, Qingdao (CN); Xiaohao Wang, Qingdao (CN); Longfei Li, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/560,982

(22) PCT Filed: Dec. 8, 2022

(86) PCT No.: PCT/CN2022/137481
§ 371 (c)(1),
(2) Date: Nov. 15, 2023

(87) PCT Pub. No.: WO2024/103460
PCT Pub. Date: May 23, 2024

(30) Foreign Application Priority Data

Nov. 15, 2022 (CN) .......................... 202211420211.1

(51) Int. Cl.
*G01N 3/24* (2006.01)
*G01N 3/22* (2006.01)

(52) U.S. Cl.
CPC ................. *G01N 3/24* (2013.01); *G01N 3/22* (2013.01)

(58) Field of Classification Search
CPC .......... G01N 3/303; G01N 19/02; G01N 3/00; G01N 1/286; G01N 3/24; G01N 3/22;
(Continued)

(56) References Cited

FOREIGN PATENT DOCUMENTS

| CN | 110243701 A | 9/2019 |
|---|---|---|
| CN | 110261234 A | 9/2019 |

(Continued)

OTHER PUBLICATIONS

Search Report issued in Chinese Patent Application No. 202211420211.1; dated May 13, 2023; 5 pgs.

(Continued)

*Primary Examiner* — Brandi N Hopkins
(74) *Attorney, Agent, or Firm* — HAUPTMAN HAM, LLP

(57) ABSTRACT

A test system for an anchoring performance of a full-size rock mass anchor bolt under combined load and relates to the technical field of detection test equipment includes a primary frame, a co-directional pull-twist loading mechanism and a vertical shear loading mechanism. The primary frame includes a dual-parallel horizontal reaction frame and a vertical reaction frame. The co-directional pull-twist loading mechanism and the vertical shear loading mechanism are arranged in synergy with the primary frame. The co-directional pull-twist loading mechanism performs synchronous pull and twist loading for the anchored rock mass and the vertical shear loading mechanism applies a static load or simulates a dynamic load disturbance. The co-directional (Continued)

pull-twist loading mechanism and the vertical shear loading mechanism perform separate loading.

4 Claims, 7 Drawing Sheets

(58) Field of Classification Search
CPC .......... G01N 3/56; G01N 15/082; G01N 3/20; G01N 3/58; G01N 3/18; Y02A 10/23; G01L 5/08; G01M 13/00; G01M 13/04; E02D 33/00
See application file for complete search history.

(56) References Cited

FOREIGN PATENT DOCUMENTS

| | | |
|---|---|---|
| CN | 110274831 A | 9/2019 |
| CN | 111982691 A | 11/2020 |

OTHER PUBLICATIONS

First Office Action issued in Chinese Patent Application No. 202211420211.1; mailed May 14, 2023; 8 pgs.
Notice of Grant issued in Chinese Patent Application No. 202211420211.1; mailed Jul. 25, 2023; 5 pgs.
International Search Report and Written Opinion issued in International No. PCT/CN2022/137481; mailed Jul. 18, 2023; 14 pgs.

TEST SYSTEM AND METHOD FOR ANCHORING PERFORMANCE OF FULL-SIZE ROCK MASS ANCHOR BOLT UNDER COMBINED LOAD

RELATED APPLICATIONS

The present application is a U.S. National Phase of International Application Number PCT/CN2022/137481 filed Dec. 8, 2022, and claims priority to Chinese Application Number 202211420211.1 filed Nov. 15, 2022.

TECHNICAL FIELD

The present disclosure relates to technical field of detection equipment, and in particular to a test system and method for an anchoring performance of a full-size rock mass anchor bolt under combined load.

BACKGROUND

The anchoring supporting technologies have been widely applied to the engineering fields such as coal mines, tunnels and water conservations and the like. The anchoring manner usually is to anchor those anchor bolts and anchor cables and the like (collectively called "anchor bolts") into rock masses by using resin binder or grout to increase the bearing performance of the surrounding rocks. During the service process of the anchor bolts, they mainly receive a pull force generated due to surrounding rock bulking between the bonding segment of the anchor bolts and the support disks, a twisting force residual at the time of anchor bolt installation, and shearing, bending and twisting loads arising from dislocation and deflection and the like of the surrounding rocks in a late period, that is, the anchor bolts usually work under the working conditions of combined loads.

Numerous engineering practices and researches show that the force-receiving state of the anchor bolts in the surrounding rocks can impose significant impact on the anchoring performance. When the anchoring performance of the anchor bolts is tested in a laboratory, it is required to restore the engineering site as possible. Therefore, during indoor static load and rheological tests, the full-size anchor bolts are usually anchored into the concrete or rock blocks simulating the surrounding rocks, and then a pull, twist or shear load is applied to the concrete or rock blocks to simulate a combined force-receiving state of the anchor bolts in the real formation. In the prior arts, the full-size anchor bolt supporting test apparatus cannot solve the following problems in a scientific way: (1) the engineering anchor bolts are usually 20 to 30 mm in diameter, and the yielding strength is generally greater than 300 MPa; the size of the simulation rock mass for performing test on the full-size real anchor bolts in a laboratory is also large, and thus it is necessary to find a way of effectively applying a complex load to the rock masses; (2) the real surrounding rocks are affected by fracture cutting and stratification and the anchored rock masses usually are split out along the fractures and thus the anchor bolts at the position of the fracture face is liable to a combined stress of pull, shear and twist and therefore, the bonding interface is more easily split and failed at this position. It is necessary to find a way of applying a complex load to the anchor bolts of a same fracture face, that is, of enabling the anchor bolts and the rock masses to generate combined stress at the single bonding interface. (3) During the design and processing procedure of a servo control anchor supporting test machine, the above two problems are usually restricted mutually, for example, at the time of twisting of the rock masses, it is difficult to achieve pull and shear loading; at the time of shearing of the rock masses, it is difficult to achieve pull and twisting loading; thus, it is necessary to find a way of properly arranging a structure of a full-size anchoring test system.

In the existing patented technologies, there are Chinese patents such as device and method for test of anchor bolt (cable) supporting structure and comprehensive test of performance of anchoring system (CN110274831A) and device and method for anchoring control simulation test of bed separation of fractured rock mass (CN110261234A) and the like. But, in order to further increase the control of an anchoring tester on an applied load, especially achieve scientific and operable cooperation of pull, twist and shear, and more conveniently and more accurately test an anchoring performance of a full-size rock mass anchor bolt under the joint action of multiple loads, it is required to carry out a test on the anchoring performance of the full-size rock mass anchor bolt under the working condition of combined load.

SUMMARY

In order to help to test an anchoring performance of a full-size rock mass anchor bolt under the joint action of multiple loads and perform test of the anchoring performance of the full-size rock mass anchor bolt under the working condition of combined load, the present disclosure provides a test system and method for an anchoring performance of a full-size rock mass anchor bolt under combined load. The specific technical solution is described below.

There is provided a test system for an anchoring performance of a full-size rock mass anchor bolt under combined load, which includes: a primary frame, a co-directional pull-twist loading mechanism and a vertical shear loading mechanism. The primary frame includes a dual-parallel horizontal reaction frame and a vertical reaction frame, where the vertical reaction frame is disposed on the dual-parallel horizontal reaction frame. The co-directional pull-twist loading mechanism and the vertical shear loading mechanism are arranged in synergy with the primary frame. The co-directional pull-twist loading mechanism performs synchronous pull and twist loading for the anchored rock mass and the vertical shear loading mechanism applies a static load or simulates a dynamic load disturbance. The co-directional pull-twist loading mechanism and the vertical shear loading mechanism perform separate loading.

Preferably, the dual-parallel horizontal reaction frame includes an outer side plate, an inner side plate, a front bearing plate, a rear bearing plate, a support base, and a ground cushion plate. The inner side plate and the outer side plate are arranged in parallel, with a mounting space reserved therebetween. The front bearing plate and the rear bearing plate are disposed at both ends of the inner side plate and the outer side plate respectively. The support base is fixed on the ground cushion plate.

Preferably, the vertical reaction frame includes an upper bearing plate, a reaction frame light bar, a lower bearing plate and a movement track. The movement track is fixedly disposed on the ground cushion plates and the vertical reaction frame moves along the movement track. The reaction frame light bars are disposed under the upper bearing plate and cooperatively mounted in the mounting space between the inner side plates and the outer side plates.

Preferably, the co-directional pull-twist loading mechanism includes a pull loading mechanism, a linkage mechanism, and a twist loading mechanism, where the linkage mechanism is disposed between the twist loading mechanism and the pull loading mechanism. The pull loading mechanism includes a horizontal pull-press oil cylinder, an oil cylinder fixing rod, a directional guide rod, a first guide plate, a wheel spoke sensor and an inner-thread screw hole connection disk. The twist loading mechanism includes a twist motor, a motor fixing seat, a motor fixing frame, a first twist transmission shaft, a torque sensor, a second twist transmission shaft, a ball bearing, a slide block, a guide rail, a fixing giant plate and a fixing plate. The linkage mechanism includes a double row cylindrical roller bearing, a second guide plate, a first belt wheel, a single-direction thrust ball bearing, a cylindrical rotary shaft, a thrust cylindrical roller bearing, a fixed shaft, a belt, a second belt wheel, a linkage frame and a connection sleeve.

Preferably, the horizontal pull-press oil cylinder is a bidirectional loading oil cylinder. The horizontal pull-press oil cylinder is fixed on the front bearing plate of the primary frame by using the fixing rod. A round hole with a diameter greater than a piston diameter of the horizontal pull-press oil cylinder is reserved on the bearing plate. At a piston tail of the horizontal pull-press oil cylinder is a reduced thread screw rod in cooperation with the wheel spoke sensor. The wheel spoke sensor is fixedly connected to the first guide plate and the inner-thread screw hole connection disk by using a long thread stud. The first guide plate is provided with a drill hole with a diameter greater than the piston diameter of the horizontal pull-press oil cylinder. The wheel spoke sensor senses an axial pull force between the horizontal pull-press oil cylinder and the fixed shaft, and the inner-thread screw hole connection disk is fixed to a thread screw rod at a front end of the fixed shaft. The single-direction thrust ball bearing and the thrust cylindrical roller bearing are disposed inside an inner chamber formed by coupling a rear side of the inner-thread screw hole connection disk to a section-changing cylindrical rotary shaft by the fixed shaft; the double row cylindrical roller bearing is disposed inside an inner chamber formed by the section-changing cylindrical rotary shaft and the second guide plate, and the cylindrical rotary shaft rotates around the fixed shaft.

Preferably, the first guide plate and the second guide plate are connected to the front bearing plate of the primary frame by the directional guide rod. The first belt wheel is mounted on an outer ring of the section-changing cylindrical rotary shaft, the twist motor drives the second belt wheel to rotate, and the belt is connected to the first belt wheel and the second belt wheel. The rotation of the first belt wheel brings the section-changing cylindrical rotary shaft and a pull-twist loading frame to rotate. The twist motor is mounted on the twist motor fixing frame by the motor fixing seat, and the twist motor fixing frame is fixedly mounted on the slide block of the fixing giant plate of the twist loading mechanism. The slide block is cooperated on the guide rail of the twist loading mechanism, and the fixing giant plate is connected to the side plates of the primary frame by a torque reaction plate.

Preferably, the motor fixing seat is a hollow cylindrical structure through which the first twist transmission shaft runs to connect the rotary shaft of the twist motor. The first twist transmission shaft and the second twist transmission shaft both are connected with the torque sensor. The second twist transmission shaft is connected with the ball bearing and the second belt wheel, and the ball bearing is disposed on the slide block of the fixing giant plate by a bearing seat. The twist motor fixing frame is fixedly connected to the first guide plate and the second guide plate by the linkage mechanism. An upper part of the linkage mechanism is connected to a twist loading device by a guide rail slide block mechanism. The twist loading mechanism moves in synchronization with an intermediate linkage mechanism and the pull loading mechanism by the linkage mechanism.

Further preferably, the vertical shear loading mechanism includes: a vertical pull-press dynamic-static load oil cylinder, an oil cylinder fixing rod, a bladder-type energy accumulator, an oil cylinder communicating device, a vertical loading wheel spoke sensor, a connection disk, a loading column, and a loading plate. The bladder type energy accumulator is connected with the oil cylinder communicating device and the pull-press dynamic-static load oil cylinder. An oil cylinder piston of the pull-press dynamic-static load oil cylinder is fixedly connected to the vertical loading wheel spoke sensor, the connection disk, the loading column, and the loading plate sequentially.

There is also provided a test method of an anchoring performance of a full-size rock mass anchor bolt under combined load, which uses the above test system for the anchoring performance of the full-size rock mass anchor bolt under combined load. The test method includes: when pull test is performed on the full-size anchor bolt, mounting the pull-twist hydraulic fixture and a fixing baffle plate of the anchor bolt pull-twist hydraulic fixture; applying a pull force by using the co-directional pull-twist loading mechanism to test pull parameters of the anchor bolt in the rock mass; when pull-twist test is performed on the full-size anchor bolt, mounting the pull-twist hydraulic fixture and the fixing baffle plate of the anchor bolt pull-twist hydraulic fixture; applying a pull force and a twist force by using the co-directional pull-twist loading mechanism to test pull-twist parameters of the anchor bolt in the rock mass; when pull-shear-twist test is performed on the full-size anchor bolt, applying a pull force and a twist force by using the co-directional pull-twist loading mechanism and applying a vertical shear load to any axial position of an anchor bolt body.

There is further provided a test method of an anchoring performance of a full-size rock mass anchor bolt under combined load, which uses the above test system for the anchoring performance of the full-size rock mass anchor bolt under combined load. The test method includes: performing test of separate performance of pull, twist and shear of a full-size anchor bolt or rod-like material; or, performing comprehensive mechanical performance test of pull, twist and shear on a full-size anchor bolt or rod-like material; or applying a coupled load of twist, twist and shear on a same fracture surface of a fractured anchored rock mass test sample; or, simulating a force received by the anchor bolt under the conditions of deformation of roadway side and fracture expansion. The anchored matrix test sample of the full-size anchor bolt is a sectionally-circular anchored rock mass test sample. The fractured anchored rock mass test sample includes multiple series-connected anchored matrix test samples.

The test system and method for the anchoring performance of the full-size rock mass anchor bolt under combined load have the following beneficial effects.

(1) The test system may perform mechanical performance test on the full-sized pre-stressed anchor bolt under servo control under the condition of a combined force received by a single section and also the test system is applicable to the mechanical performance test of separate pull, separate twist, and separate shear of the rod-like members such as metal material, non-metal material and composite material and the like.

(2) The system can perform effective loading on the large-size anchored rock mass test piece and can apply a coupled load of pull, shear and twist on a same anchored fracture surface to effectively test the comprehensive mechanical performance of the anchor bolt member in the rock mass under combined stress.

(3) In the test system, the twist loading system is integrated to the pull loading system at the front end of the tester to achieve synchronous loading pull and twist; the dynamic-static load shear system is designed as movable to achieve application of a shear load to any fractured rock mass surface.

(4) The method performing test by using the multi-functionality of the system not only has the test functions of the general anchoring mechanical tester for anchoring members and small-size anchored rock mass test piece but also reasonably designs a loading test system of pull, shear and twist to facilitate installation and test detection of the large-size anchored rock mass test sample.

BRIEF DESCRIPTIONS OF THE DRAWINGS

Figure 1:
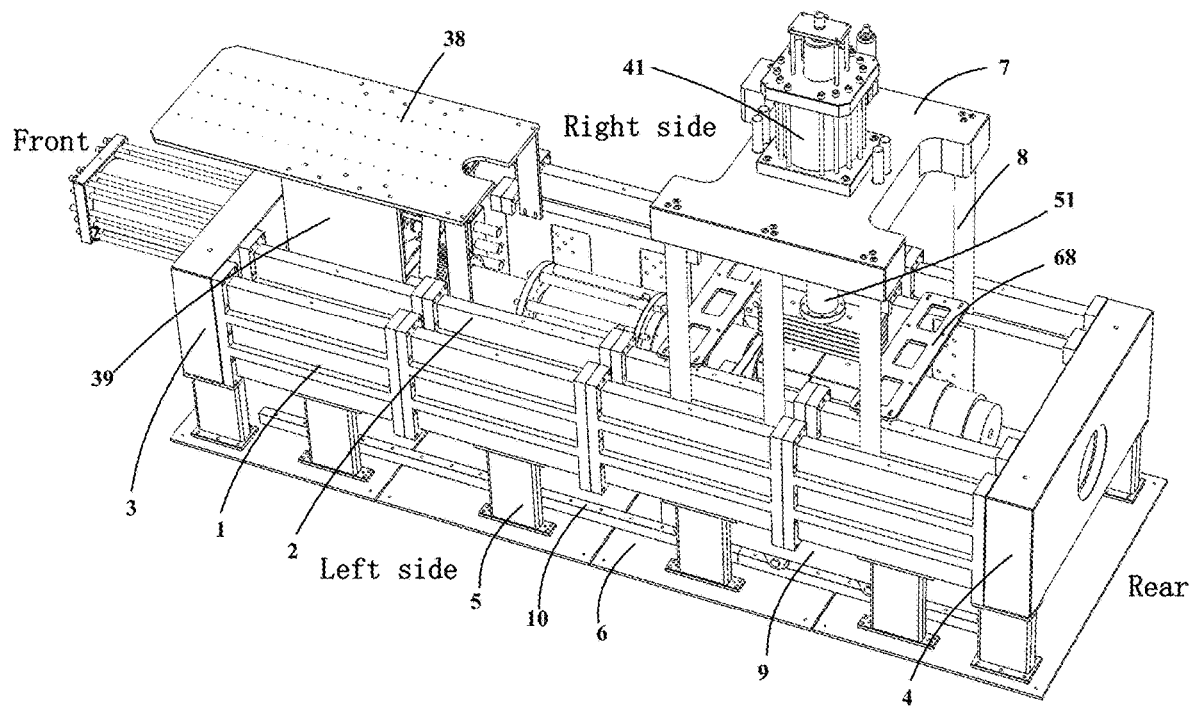
FIG. 1 is a structural schematic diagram illustrating a test system for an anchoring performance of a full-size rock mass anchor bolt under combined load.
Figure 2:
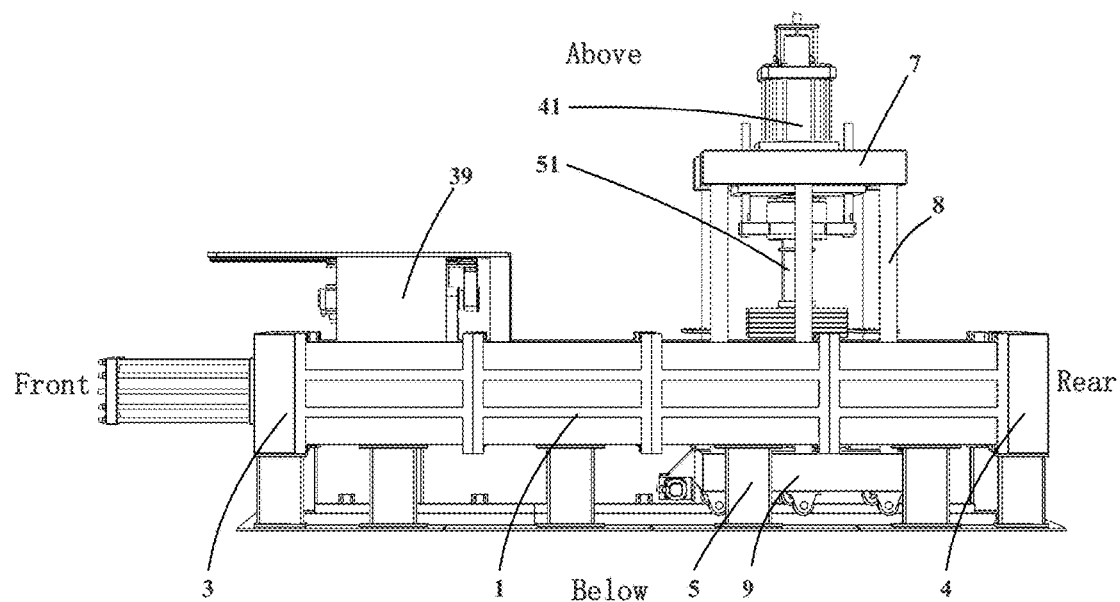
FIG. 2 is a side view of the test system.
Figure 3:
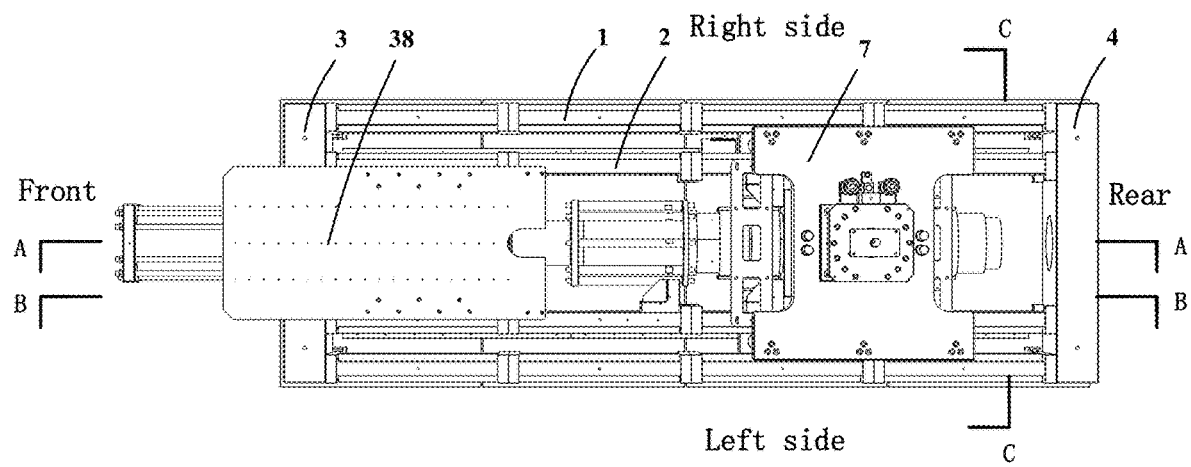
FIG. 3 is a top view of the test system.
Figure 4:
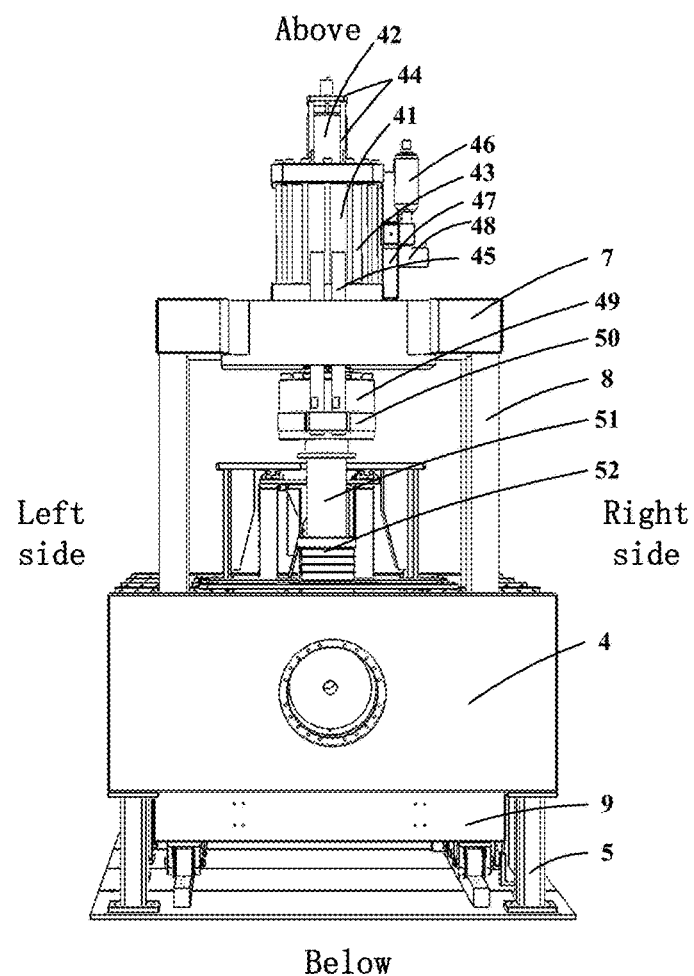
FIG. 4 is a rear view of the test system.

The numerals of the drawings are described below:

1. outer side plate, 2. inner side plate, 3. front bearing plate, 4. rear bearing plate, 5. support base, 6. ground cushion plate, 7. upper bearing plate, 8. reaction frame light bar, 9. lower bearing plate, 10. movement track, 11. horizontal pull-press oil cylinder, 12. oil cylinder fixing rod, 13. piston, 14. directional guide rod, 15. first guide plate, 16. wheel spoke sensor, 17. inner-thread screw hole connection disk, 18. double row cylindrical roller bearing, 19. second guide plate, 20. first belt wheel, 21. single-direction thrust ball bearing, 22. cylindrical rotary shaft, 23. thrust cylindrical roller bearing. 24. fixed shaft, 25. belt, 26. second belt wheel, 27. twist motor, 28. motor fixing seat, 29. motor fixing frame, 30. first twist transmission shaft, 31. torque sensor, 32. second twist transmission shaft, 33. ball bearing, 34. bearing seat, 35. linkage frame, 36. slide block, 27. guide rail, 38. fixing giant plate, 39. fixing plate, 40. connection sleeve, 41. vertical pull-press dynamic-static load oil cylinder, 42. piston of vertical pull-press dynamic-static load oil cylinder, 43. oil cylinder fixing rod, 44. piston-upper-part guide rod frame, 45. piston-lower-part guide rod, 46. bladder type energy accumulator, 47. oil cylinder communicating device, 48. bladder-type energy accumulator control valve, 49. vertical loading wheel spoke sensor, 50. connection disk, 51. loading column, 52. loading plate, 53. arc-shaped loading plate, 54. pressure-bearing cushion plate, 55. sectionally-circular anchored matrix test sample, 55-1. No. 1 anchored matrix test sample, 55-2. No. 2 anchored matrix test sample, 55-3. No. 3 anchored matrix test sample, 55-4. No. 4 anchored matrix test sample, 56. horizontal movement baffle plate, 57. L-shaped baffle plate, 58. baffle plate of anchor bolt pull anchoring matrix test sample, 59. fixing baffle plate of the anchor bolt pull-twist hydraulic fixture, 60. pull-twist hydraulic fixture, 61. full-size anchor bolt, 62. anchor bolt shear upward press head, 63. anchor bolt shear downward press head, 64. anchor bolt shear adjustable support seat, 65. fixing plate of anchor bolt shear adjustable support seat, 66. front flange, 67. flange connection rod, 68. rear flange, 69. arc-shaped pressure-bearing block, 70. anti-skid washer sleeve, 71. test sample anti-twist fixing sleeve mould, 72. sleeve wear reduction washer, 73. flanged pull-shear-twist test sample mould, 74. circular wear reduction washer, 75. wheel group, 100. co-directional pull-twist loading mechanism, and 200. vertical shear loading mechanism.

DETAILED DESCRIPTIONS OF EMBODIMENTS

In combination with FIGS. 1 to 15, the specific embodiments of a test system and method for an anchoring performance of a full-size rock mass anchor bolt under combined load according to the present disclosure will be described below.

There is provided a test system for an anchoring performance of a full-size rock mass anchor bolt under combined load. The system tester is large in size and complex in structure. By using the test system, test may be performed on the full-size rock mass anchor bolt, for example, a combined load of pull, twist and shear may be applied to a rock mass to test a combined anchoring performance of each type of full-size anchor bolts (including anchor bolts, support disks, nuts and the like).

The test system includes a primary frame, a co-directional pull-twist loading mechanism and a vertical shear loading mechanism. The primary frame includes a dual-parallel horizontal reaction frame and a vertical reaction frame, where the vertical reaction frame is disposed on the dual-parallel horizontal reaction frame. The co-directional pull-twist loading mechanism and the vertical shear loading mechanism are arranged in synergy with the primary frame to achieve synchronous comprehensive loading of pull, twist and shear for an anchored rock mass test sample. The co-directional pull-twist loading mechanism performs synchronous pull and twist loading for the anchored rock mass and the vertical shear loading mechanism applies a static load or simulates a dynamic load disturbance. The co-directional pull-twist loading mechanism and the vertical shear loading mechanism perform separate loading.

The dual-parallel horizontal reaction frame includes an outer side plate 1, an inner side plate 2, a front bearing plate 3, a rear bearing plate 4, a support base 5, and a ground cushion plate 6. The inner side plate 2 and the outer side plate 1 are arranged in parallel, with a mounting space reserved therebetween. The structure facilitates fixed restriction for the anchored rock mass test sample. The front bearing plate 3 and the rear bearing plate 4 are disposed at both ends of the inner side plate 2 and the outer side plate 1 respectively. The support base 5 is fixed on the ground cushion plate. The inner side plates 2 and the outer side plates 1 are formed by splicing two groups of parallel side plates The splicing structure facilitates mounting and transportation, avoids the problem of instability arising from an excessive length of the tester along a horizontal direction and further, helps mount the anchored rock mass and the vertical reaction frame. The outer side plates 1 and the inner side plates 2 include eight outer side plates of dual-parallel horizontal reaction frame and eight inner side plates of dual-parallel horizontal reaction frame. The side plates are fixed together in pair by using screws. Based on a length of a mining engineering anchor bolt being 3 m, by subtracting a space occupied by the loading mechanisms, the length of each side plate is about 1.5 m and a lateral length is no less than 0.8 m, forming an internal test space of about $6*0.8$ m$^2$, where an inner surface of the inner side plates is flat, which helps drilling to fix an L-shaped baffle plate. Furthermore, the front bearing plate cooperates with a horizontal pull-press oil cylinder, a pull-twist hydraulic fixture is mounted on the rear bearing plate, and a horizontal pull-press rigidity of the dual-parallel horizontal reaction frame is ≥1 GN/m.

Figure 5:
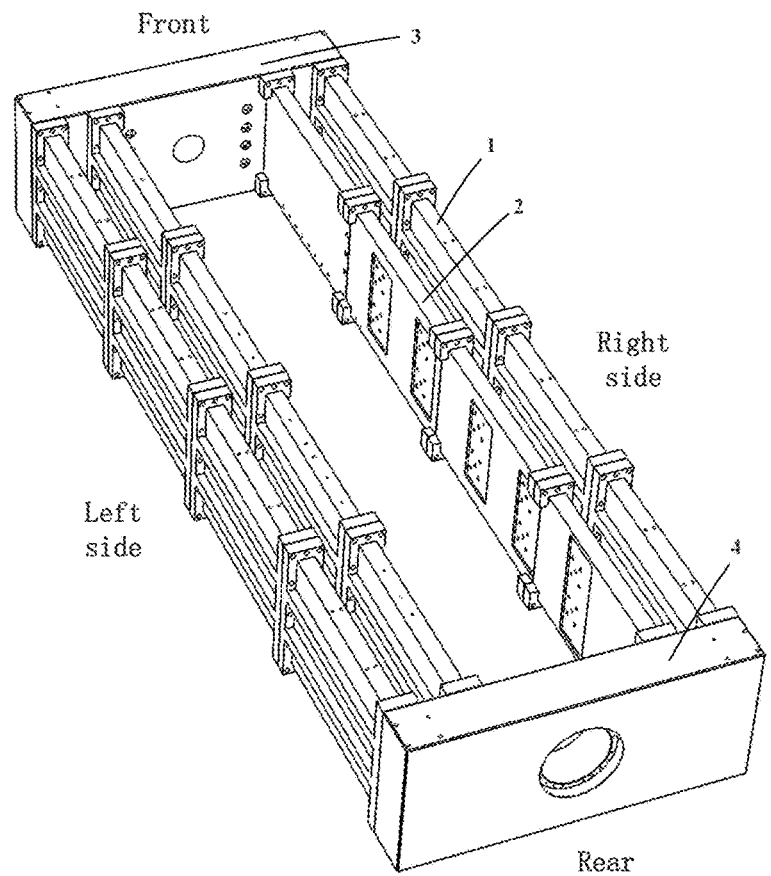
FIG. 5 is a structural schematic diagram of a dual-parallel horizontal reaction frame.
Figure 10:
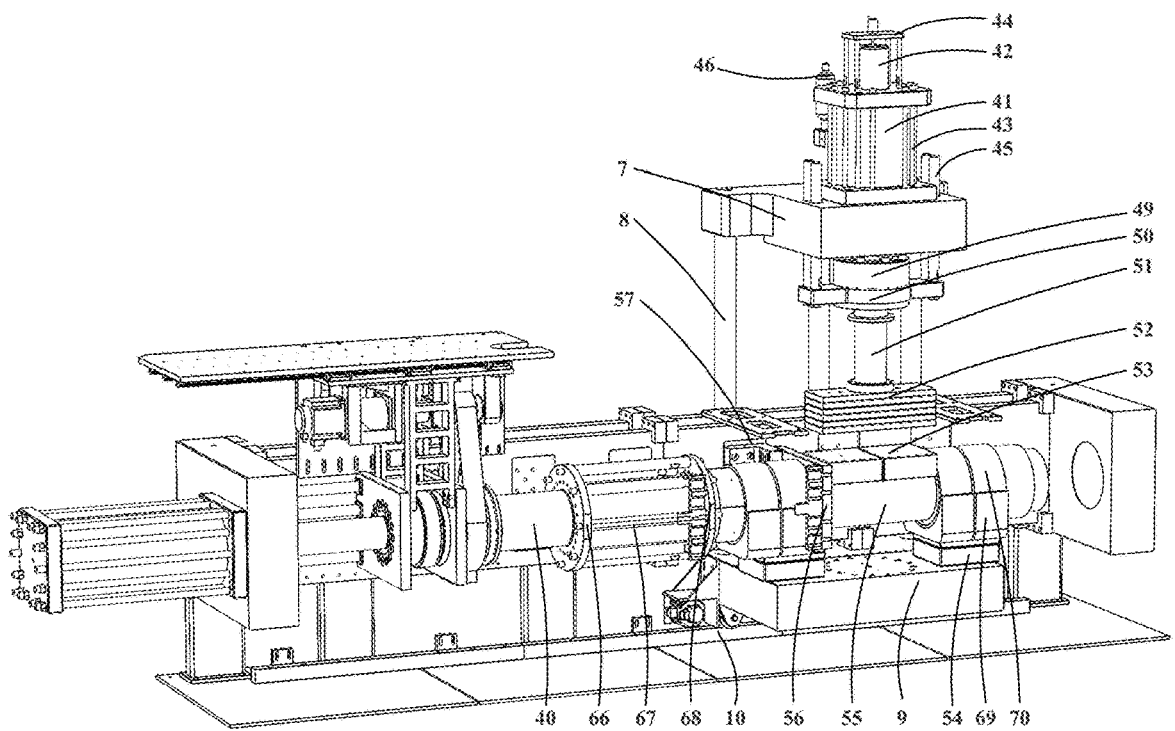
FIG. 10 is a three-dimensional axonometric diagram taken along B-B in FIG. 3.
Figure 14:
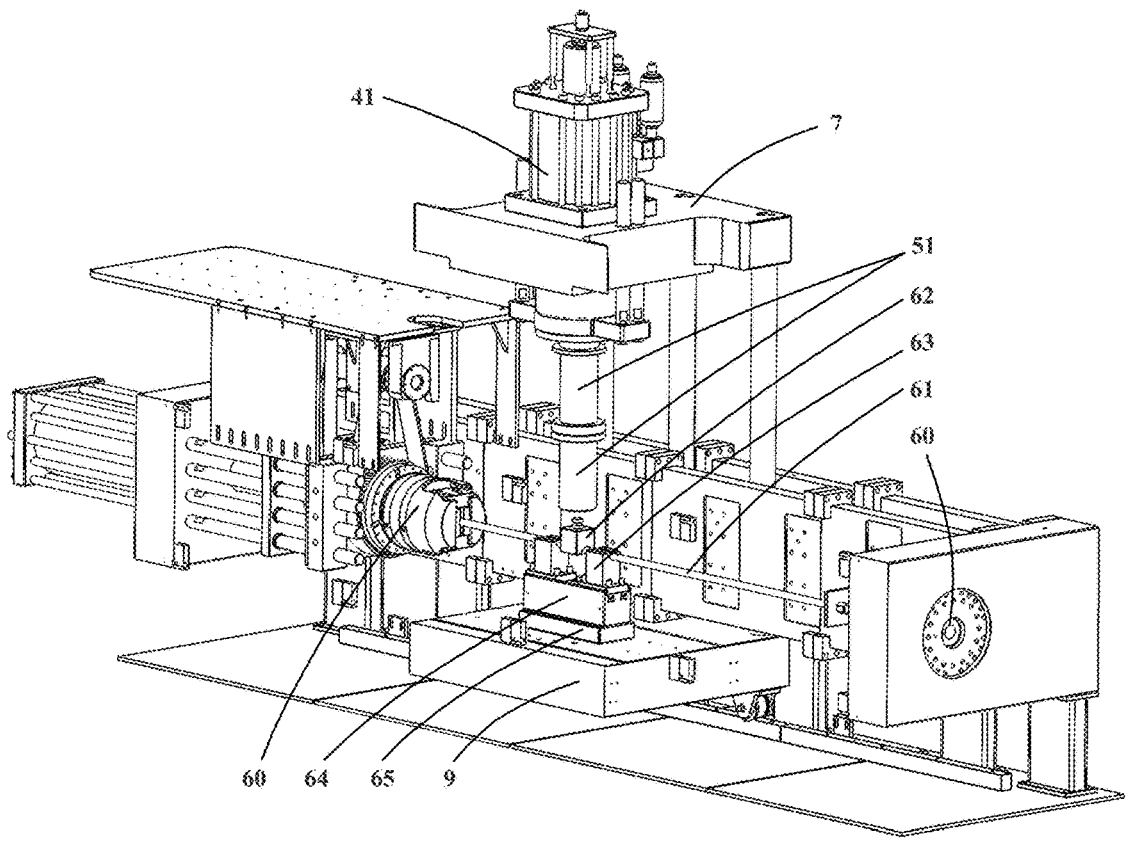
FIG. 14 is a schematic diagram illustrating a pull-shear-twist test of the anchor bolt body.

The vertical reaction frame includes an upper bearing plate 7, a reaction frame light bar 8, a lower bearing plate 9 and a movement track 10. As shown in FIG. 5, six reaction frame light bars 8 are disposed and the movement track 10 is fixedly disposed on the ground cushion plates 6. The lower bearing plate 9 of the vertical reaction frame is provided with a wheel group 75. Thus, the vertical reaction frame can move back and forth along the movement track 10 as shown in the drawing. The reaction frame light bars 8 are disposed under the upper bearing plate 7 and cooperatively mounted in the mounting space between the inner side plates 2 and the outer side plates 1. The cooperation manner of the vertical reaction frame and the dual-parallel horizontal reaction frame can avoid affecting the fixing and test implementation of the anchored rock mass test sample. If the vertical reaction frame is mounted outside the dual-parallel horizontal reaction frame, a length of the upper bearing plate 7 and the lower bearing plate 9 of the vertical reaction frame along a lateral direction of the tester is increased, lowering a vertical loading rigidity or increasing a bearing plate thickness, and hence increasing a weight of the vertical reaction structure. In this case, the wheel group 75 cannot support the back-forth movement of the vertical reaction frame within the dual-parallel horizontal reaction frame. A vertical pull-press dynamic-static load oil cylinder 41 is mounted on the upper bearing plate 7, and an anchored rock mass dual-shear test fixture or another pull-press test fixture or the like is fixedly mounted on the lower bearing plate 9, as shown in FIGS. 10 and 14. In addition, a vertical pull-press rigidity of the vertical reaction frame is ≥2 GN/m.

The co-directional pull-twist loading mechanism 100 includes a pull loading mechanism, a linkage mechanism, and a twist loading mechanism, where the linkage mechanism is disposed between the twist loading mechanism and the pull loading mechanism. The co-directional pull-twist loading mechanism can achieve comprehensive loading of pull and twist for the anchored rock mass. In addition, a quasi-static and rheological loading function is provided on a control system. The disposal of the linkage mechanism achieves synergic loading of the twist loading mechanism and the pull loading mechanism. The twist loading mechanism can move back and forth along with a piston movement of the pull loading mechanism. The pull loading mechanism includes a horizontal pull-press oil cylinder 11, an oil cylinder fixing rod 12, a directional guide rod 14, a first guide plate 15, a wheel spoke sensor 16 and an inner-thread screw hole connection disk 17. The twist loading mechanism includes a twist motor 27, a motor fixing seat 28, a motor fixing frame 29, a first twist transmission shaft 30, a torque sensor 31, a second twist transmission shaft 32, a ball bearing 33, a slide block 36, a guide rail 37, a fixing giant plate 38 and a fixing plate 39. The linkage mechanism includes a double row cylindrical roller bearing 18, a second guide plate 19, a first belt wheel 20, a single-direction thrust ball bearing 21, a cylindrical rotary shaft 22, a thrust cylindrical roller bearing 23, a fixed shaft 24, a belt 25, a second belt wheel 26, a linkage frame 35 and a connection sleeve 40. The above components cooperate with each other to achieve synchronous pull-twist loading and measurement.

The horizontal pull-press oil cylinder 11 is a bidirectional loading oil cylinder. The horizontal pull-press oil cylinder 11 is fixed on the front bearing plate 3 of the primary frame by using the fixing rod. A round hole with a diameter greater than a piston diameter of the horizontal pull-press oil cylinder is reserved on the bearing plate. At a piston tail of the horizontal pull-press oil cylinder 11 is a reduced thread screw rod in cooperation with the wheel spoke sensor 16. The wheel spoke sensor 16 is fixedly connected to the first guide plate 15 and the inner-thread screw hole connection disk 17 by using a long thread stud. The first guide plate 15 is provided with a drill hole with a diameter greater than the piston diameter of the horizontal pull-press oil cylinder. The wheel spoke sensor 16 senses an axial pull force between the horizontal pull-press oil cylinder and the fixed shaft, and the inner-thread screw hole connection disk 17 is fixed to a thread screw rod at a front end of the fixed shaft. The single-direction thrust ball bearing 21 and the thrust cylindrical roller bearing 23 are disposed inside an inner chamber formed by coupling a rear side of the inner-thread screw hole connection disk 17 to a section-changing cylindrical rotary shaft 22 by the fixed shaft; the double row cylindrical roller bearing 18 is disposed inside an inner chamber formed by the section-changing cylindrical rotary shaft 22 and the second guide plate 19, and the cylindrical rotary shaft 22 rotates around the fixed shaft.

The first guide plate 15 and the second guide plate 19 are connected to the front bearing plate of the primary frame by the directional guide rod. The first belt wheel 20 is mounted on an outer ring of the section-changing cylindrical rotary shaft, the twist motor 27 drives the second belt wheel 26 to rotate, and the belt is connected to the first belt wheel 20 and the second belt wheel 26. The rotation of the first belt wheel 20 brings the section-changing cylindrical rotary shaft and a pull-twist loading frame to rotate. The twist motor is mounted on the twist motor fixing frame by the motor fixing seat, and the twist motor fixing frame 29 is fixedly mounted on the slide block 36 of the fixing giant plate 38 of the twist loading mechanism. The slide block 36 is cooperated on the guide rail 37 of the twist loading mechanism, and the fixing giant plate is connected to the side plates of the primary frame by a torque reaction plate. The motor fixing seat 28 is a hollow cylindrical structure through which the first twist transmission shaft 30 runs to connect the rotary shaft of the twist motor 27. The first twist transmission shaft 30 and the second twist transmission shaft 32 both are connected with the torque sensor 31. The second twist transmission shaft 32 is connected with the ball bearing and the second belt wheel 26, and the ball bearing is disposed on the slide block 36 of the fixing giant plate by a bearing seat. The twist motor fixing frame 29 is fixedly connected to the first guide plate 15 and the second guide plate 19 by the linkage mechanism. An upper part of the linkage mechanism is connected to a twist loading device by a guide rail slide block mechanism. The twist loading mechanism moves in synchronization with an intermediate linkage mechanism and the pull loading mechanism by the linkage mechanism.

The vertical shear loading mechanism 200 can achieve static load and dynamic load disturbance control for the anchored rock mass. The vertical shear loading mechanism 200 specifically includes: a vertical pull-press dynamic-static load oil cylinder 41, an oil cylinder fixing rod 43, a bladder-type energy accumulator 46, an oil cylinder communicating device 47, a vertical loading wheel spoke sensor 49, a connection disk 50, a loading column 51, and a loading plate 52. The bladder type energy accumulator 46 is connected with the oil cylinder communicating device 47 and the pull-press dynamic-static load oil cylinder 41. An oil cylinder piston 42 of the pull-press dynamic-static load oil cylinder is fixedly connected to the vertical loading wheel spoke sensor 49, the connection disk 50, the loading column 51, and the loading plate 52 sequentially. The vertical pull-press dynamic-static load oil cylinder 41 is fixed to the upper bearing plate 7 of the vertical reaction frame by an oil cylinder fixing rod 43 of the vertical pull-press dynamic-static load oil cylinder. The piston 42 of the vertical pull-press dynamic-static load oil cylinder is guided by a piston-upper-part guide rod frame 44 and a piston-lower-part guide rod 45 to prevent eccentric damage of the piston loading. The bladder-type energy accumulator 46 cooperates with the vertical pull-press dynamic-static load oil cylinder 41 by members such as the oil cylinder communicating device 47 and a bladder-type energy accumulator control valve 48 and the like to achieve simulation loading of the dynamic load disturbance. The vertical loading wheel spoke sensor 49, the connection disk 50, the loading column 51 and the loading plate 52 are sequentially fixed at the lower part of the piston 42 of the vertical pull-press dynamic-static load oil cylinder. Since the sectional shape of the anchored rock mass test sample 55 is circular, the loading plate 52 has to achieve loading by an arc-shaped loading block 53 matching the test sample rather than act directly on the surface of the sectionally-circular anchored rock mass test sample 55. The sectionally-circular anchored rock mass test sample 55 is placed on the lower bearing plate 9 of the vertical reaction frame by a pressure-bearing cushion plate 54.

Figure 12:
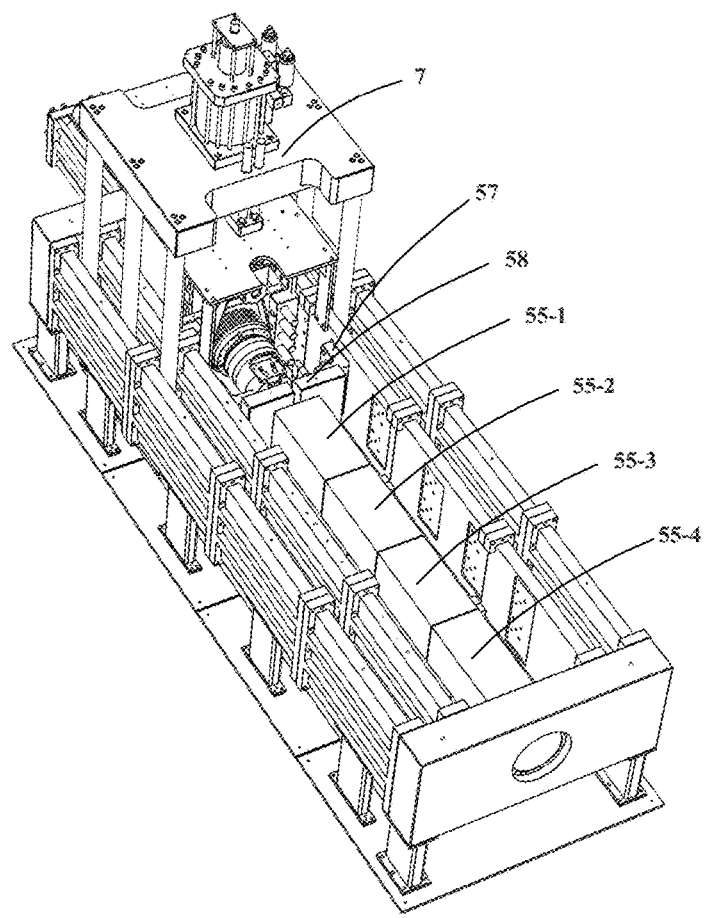
FIG. 12 is a schematic diagram illustrating a pull test of a full-size anchor bolt.
Figure 13:
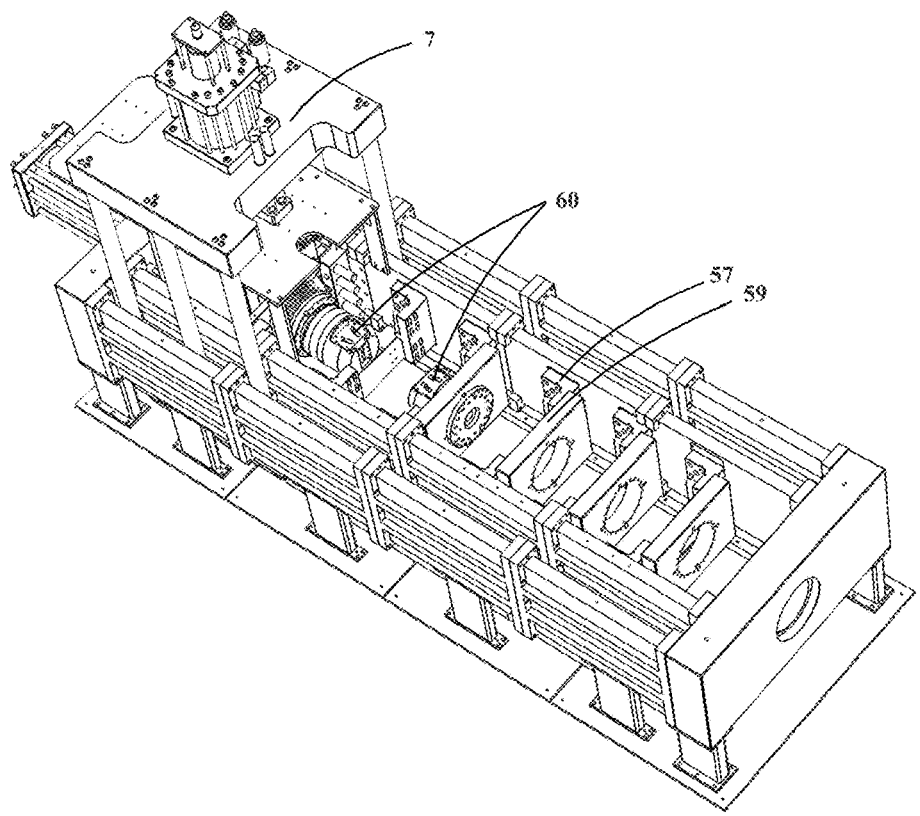
FIG. 13 is a schematic diagram illustrating a pull-twist test of an anchor bolt body.

When tests such as anchored rock mass (including anchor bolt body) pull, anchored rock mass fracture opening and pull-twist synchronous test of fractured anchored rock mass and the like are performed, the vertical shear loading mechanism 200 is not required and hence may be moved to a foremost end of the dual-parallel horizontal reaction frame of the test system to fully release a rear test space as shown in FIGS. 12 and 13. When pure shear, pull-shear, twist-shear, and pull-twist-shear tests are performed on the anchored rock mass, the vertical shear loading mechanism 200 of the anchored rock mass may be moved to a desired shear position of the dual-parallel horizontal reaction frame of the test system as shown in FIGS. 1 and 14. Since the position of the vertical shear loading mechanism 200 of the anchored rock mass can be adjustable continuously, shear loading of the full-size anchored rock mass or anchor bolt at any position can be achieved. By the above arrangement, it can be seen that the vertical shear loading mechanism 200 of the anchored rock mass and the reaction structure of the co-directional pull-twist loading mechanism 100 are not fixed together but are independent mechanisms, and thus no mutual loading influence or test interference may occur to the two mechanisms during test.

On this basis, there is also provided a test method of an anchoring performance of a full-size rock mass anchor bolt under combined load, which uses the above test system for the anchoring performance of the full-size rock mass anchor bolt under combined load. The test method includes: when pull test is performed on the full-size anchor bolt, mounting the pull-twist hydraulic fixture and a fixing baffle plate of the anchor bolt pull-twist hydraulic fixture; applying a pull force by using the co-directional pull-twist loading mechanism to test pull parameters of the anchor bolt in the rock mass; when pull-twist test is performed on the full-size anchor bolt, mounting the pull-twist hydraulic fixture and the fixing baffle plate of the anchor bolt pull-twist hydraulic fixture; applying a pull force and a twist force by using the co-directional pull-twist loading mechanism to test pull-twist parameters of the anchor bolt in the rock mass; when pull-shear-twist test is performed on the full-size anchor bolt, applying a pull force and a twist force by using the co-directional pull-twist loading mechanism and applying a vertical shear load to any axial position of an anchor bolt body.

As shown in FIG. 12, if only the pull test is performed on the full-size anchor bolt, it is required to replace a horizontal movement baffle plate 56 of an anchor bolt pull-shear-twist anchoring matrix test sample with a baffle plate 58 of an anchor bolt pull anchoring matrix test sample, and replace the pull-twist hydraulic fixture 60 with the connection sleeve 40 to fix the anchor bolt body 61 for performing pull test for the anchor bolt in the rock mass.

As shown in FIG. 13, if only the pull-twist test is performed on the full-size anchor bolt, it is required to replace the horizontal movement baffle plate 56 of the anchor bolt pull-shear-twist anchoring matrix test sample with a fixing baffle plate 59 of the anchor bolt pull-twist hydraulic fixture, and mount the pull-twist hydraulic fixture 60. By adjusting the position of a rear set of pull-twist hydraulic fixture 60, pull-twist test can be performed on the anchor bolts of different lengths.

If only the pull-shear-twist test is performed on the full-size anchor bolt, when a loading length of the vertical shear loading mechanism 200 is not sufficient, another one loading column 51 may be series-connected and an anchor bolt shear adjustable support seat 64 with an anchor bolt shear downward press head 63 is fixed by a fixing plate 65 of the anchor bolt shear adjustable support seat on the lower bearing plate 9 of the vertical reaction frame, so as to achieve vertical shear test of any axial pull-twist coupling position of the anchor bolt body.

On this basis, there is further provided a test method of an anchoring performance of a full-size rock mass anchor bolt under combined load, which uses the above test system for the anchoring performance of the full-size rock mass anchor bolt under combined load. The test method includes: performing test of separate performance of pull, twist and shear of a full-size anchor bolt or rod-like material; or, performing comprehensive mechanical performance test of pull, twist and shear on a full-size anchor bolt or rod-like material; or applying a coupled load of twist, twist and shear on a same fracture surface of a fractured anchored rock mass test sample; or, simulating a force received by the anchor bolt under the conditions of deformation of roadway side and fracture expansion. The anchored matrix test sample of the full-size anchor bolt is a sectionally-circular anchored rock mass test sample. The fractured anchored rock mass test sample includes multiple series-connected anchored matrix test samples.

In order to avoid a test-scale error resulting from similar operations, a test result is directly applied to the engineering problems. The sectionally-circular anchored rock mass test sample 55 is a full-size test sample, namely, the full-size anchor bolt 61 is an engineering-scale anchor bolt with its usual diameter being 20 mm, 24 mm, 26 mm and the like. Furthermore, the radial size of the anchored matrix test sample 55 should ensure that the anchored matrix test sample 55 shall not be completely fractured to be invalid before the anchor bolt is damaged under the load effect of any combination of pull, twist, shear or the like, namely, in a case of complete failure of the anchor bolt, the fracturing of the anchored matrix test sample 55 has not reached the outermost layer of the anchored matrix test sample. The axial size of the anchored matrix test sample 55 or another combination sample should reach the maximum bonding size of the full-length anchor bolt. For example, if an anchoring length of an engineering anchor bolt is 2.4 meters, the total length of the anchored matrix test sample 55 combination shall not be less than 2.4 meters. In order to facilitate test sample processing and transportation, the anchored matrix test sample of 2.4 meters long may be divided into four blocks to be separately poured.

The combination piece of the fractured anchored rock mass test sample 55 is formed by performing series anchoring on multiple anchored matrix test samples (55-1, 55-2, 55-3, 55-4) by the anchor bolt. A gap between the anchored matrix test samples is used to simulate an engineering fracture, the size of which is adjustable depending on the researched engineering problem. As shown in FIG. 10, in this embodiment, the simulated engineering fracture is in the middle of the anchored rock mass, that is, the fracture is located between the No. 2 anchored matrix test sample 55-2 and the No. 3 anchored matrix test sample 55-3. When pull-shear-twist synchronous loading test is performed, the No. 1 anchored matrix test sample 55-1 and the No. 2 anchored matrix test sample 55-2 receive pull-twist load effect to restrict the vertical displacement of the No. 2 anchored matrix test sample 55-2; the No. 3 anchored matrix test sample 55-3 receives shear load effect to restrict its back-forth and twist movement displacement; No. 4 anchored matrix test sample 55-4 is to be fixed and restricted; at the fracture between the No. 2 anchored matrix test sample 55-2 and the No. 3 anchored matrix test sample 55-3, the anchor bolt and the rock mass interface receive pull-shear-twist combined stress effect. Meanwhile, since the vertical shear loading mechanism 200 can move back and forth, the size of the anchored matrix test samples 55 may be changed in advance or a fracture is prepared in advance, so as to achieve the shear test for the fractured anchored rock mass with different anchoring depths.

Figure 6:
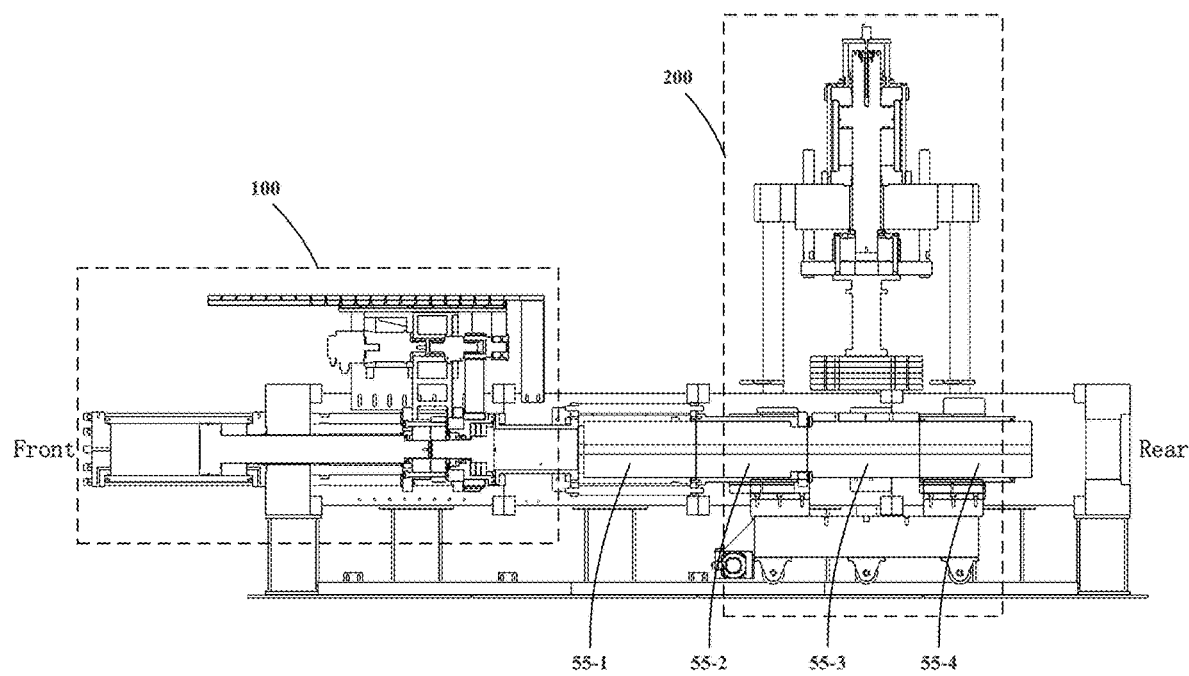
FIG. 6 is a sectional view taken along A-A in FIG. 3.
Figure 7:
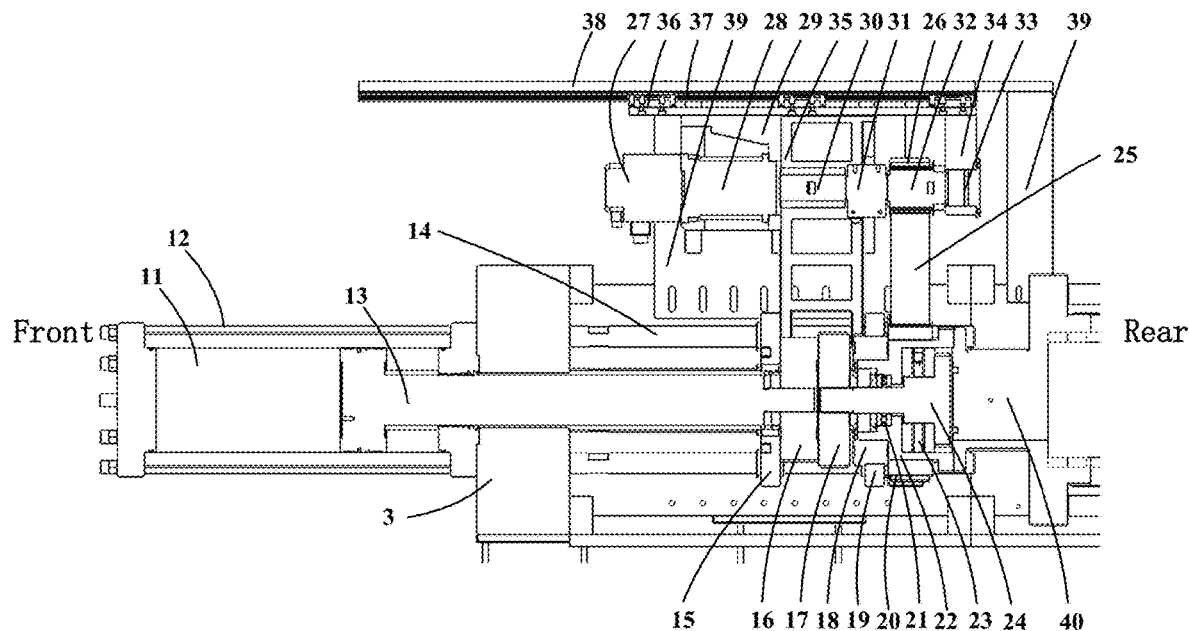
FIG. 7 is a sectional view of a co-directional pull-twist loading mechanism.
Figure 8:
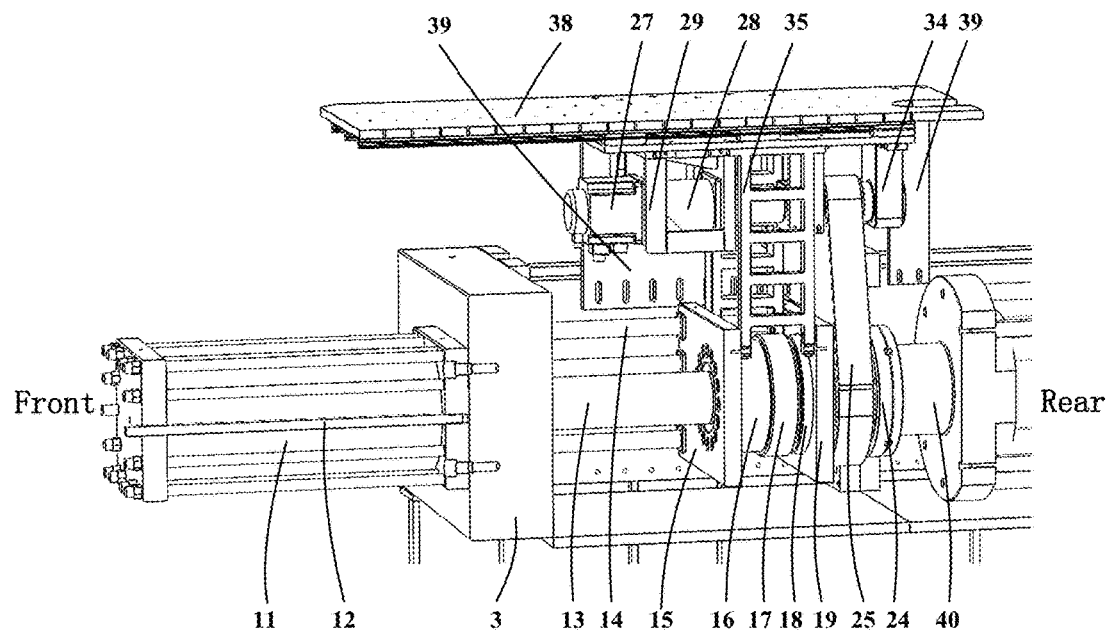
FIG. 8 is a structural schematic diagram illustrating the co-directional pull-twist loading mechanism.
Figure 9:
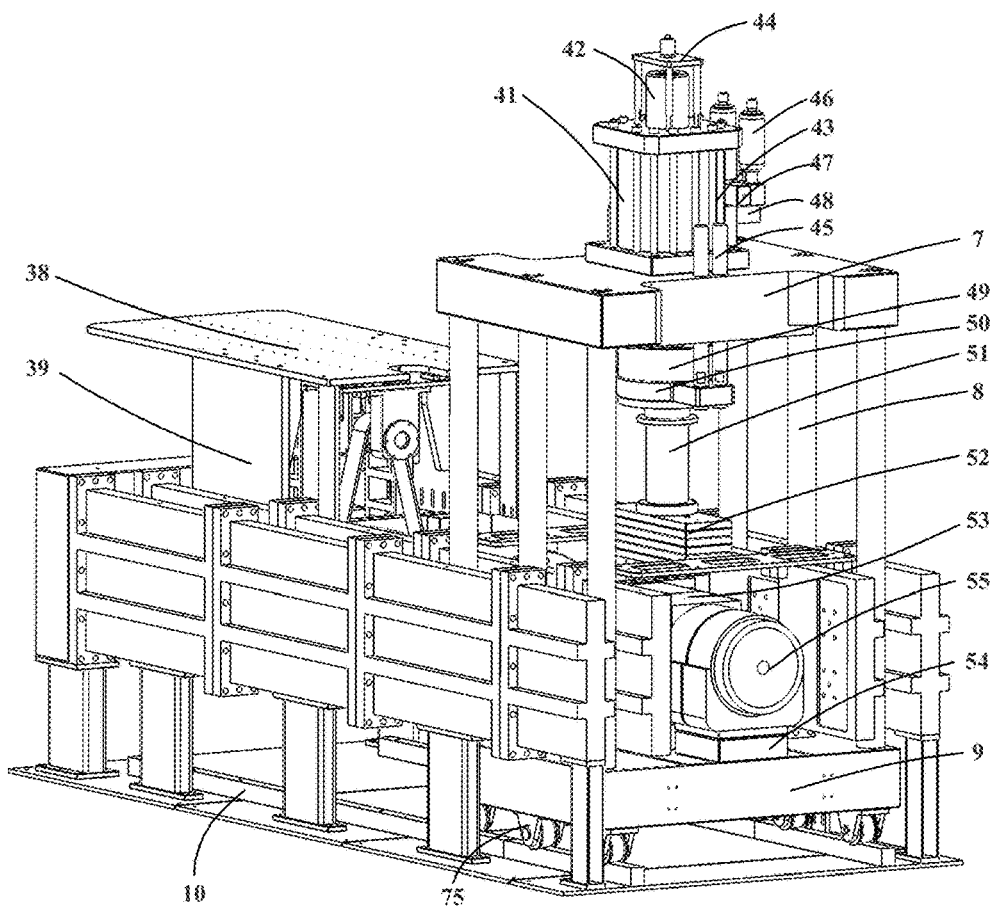
FIG. 9 is a three-dimensional axonometric diagram taken along C-C in FIG. 3.
Figure 11:
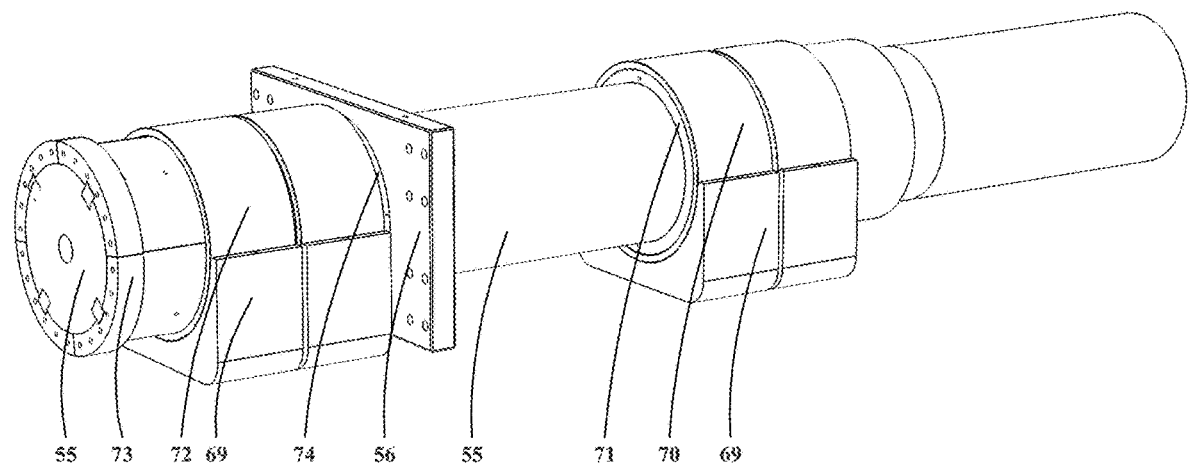
FIG. 11 is a schematic diagram illustrating of an assembling structure of an anchored rock mass test sample for pull, shear and twist test.

In order to achieve twist loading and restriction for the No. 1 anchored matrix test sample 55-1, the No. 2 anchored matrix test sample 55-2 and the No. 3 anchored matrix test sample, it is required to pour the anchored matrix test sample 55 into a flanged pull-shear-twist test sample mould 73 and internal longitudinal ribs. As shown in FIG. 11, the flanged pull-shear-twist test sample mould 73 is formed by four petals which facilitate disassembling after test and reuse. A sleeve wear reduction washer 72 is mounted between the flanged pull-shear-twist test sample mould 73 of the No. 1 anchored matrix test sample 55-1 and the No. 2 anchored matrix test sample 55-2 and an arc-shaped pressure-bearing block, so as to achieve twist function. As shown in FIGS. 6 and 10, the connection structure formed by a front flange, a flange connection rod, and a rear flange is fixed to the flanged pull-shear-twist test sample mould 73 to achieve pull-twist loading for the No. 1 anchored matrix test sample 55-1, the No. 2 anchored matrix test sample 55-2, where the front flange is fixedly series-connected with the connection sleeve 40 mounted on the co-directional pull-twist loading test system 100 of the anchored rock mass. The No. 3 anchored matrix test sample 55-3 is poured into a test sample anti-twist fixing sleeve mould 71, and an anti-skid washer sleeve 70 with the same thickness as the wear reduction washer 72 is mounted between the test sample anti-twist fixing sleeve mould 71 and the arc-shaped pressure-bearing block so as to achieve the same test sample height. The test sample anti-twist fixing sleeve mould 71 and the anti-skid washer sleeve 70 may be fixed on the arc-shaped pressure-bearing block 69 by screws and thus further fixed on the lower bearing plate 9 of the vertical reaction frame, so as to achieve the purpose of fixing constraint. The No. 3 anchored matrix test sample 55-3 is constrained for back and forth displacement by using the horizontal movement baffle plate 56 of the anchor bolt pull-shear-twist anchoring matrix test sample and the L-shaped baffle plates 57 fixed on the inner side plates 2 of the dual-parallel horizontal refraction frame. As shown in FIG. 11, a circular wear reduction washer 74 is disposed before and after the horizontal movement baffle plate 56 of the anchor bolt pull-shear-twist anchoring matrix test sample respectively to overcome friction with the anchored matrix test sample 55.

The test method for performing test using the above test system for the anchoring performance of the full-size rock mass anchor bolt under combined load further includes the followings.

(1) Standard test is performed on the mechanical performance of the anchor bolt body of the full-size anchor bolt 61 under servo control condition. The test is also applicable to the mechanical performance test of separate pull, separate twist, and separate shear of the rod-like members such as metal material, non-metal material and composite material and the like.

(2) Pull-shear-twist synchronous coupling test may be performed on the anchor bolt body (excluding the simulation rock block) of the full-size anchor bolt 61 to test a comprehensive mechanical performance of the anchor bolt member under the condition of combined force, as shown in FIG. 14.

(3) One end of the anchor bolt is anchored into a material such as a rock block, a concrete block or a steel pipe and the like, and the other end of the anchor bolt is under the pull test of the anchor bolt. In this case, the sectional shape of the anchored matrix test sample 55 may be rectangle as shown in FIG. 12.

(4) The anchored rock mass fracture opening test is performed. In the embodiment shown in FIGS. 6 and 12, it is recommended to use four columns of Φ300× 600 mm or rectangular concrete blocks of 300×300× 600 mm to simulate the fractured rock mass with its size no less than the above size. During test, the first, second or third concrete block is pulled to simulate a load applied by the deformation of the roadway side or the fracture opening to the anchor bolt.

(5) During the separate shear test of the anchored rock mass, the rock mass or the concrete block may be loaded to complete dual-shear test of the anchored rock mass.

(6) During the separate twist test of the anchored rock mass, a torque may be applied to the anchored rock mass or concrete block test piece to perform twist loading on a given section of the anchor bolt.

(7) During the pull test of the fractured anchored rock mass, the anchored rock mass shear test and the anchored rock mass twist test may be coupled to simulate a complex force-receiving state of the anchor bolt in a complex roadway, and it is guaranteed that the same section of the anchor bolt receives the pull-shear-twist combined mechanical effect, as shown in FIG. 10.

(8) During the above test processes, the embodiments provided facilitate use of the displacement sensor top monitor each rock mass test sample and the anchor bolt component deformation, use of electric test method of strain and optical fiber sensor and the like to monitor the force and deformation occurring to the anchor bolt body and the support disk, use of Digital Speckle Correlation Method to monitor a strain field of a surface of the rock mass and use of acoustic emission to monitor microcrack generation and propagation rule at the anchoring interface.

Of course, the above descriptions are not intended to limit the present disclosure and the present disclosure is also not limited to the above embodiments. All changes, variations, additions or replacements made by those skilled in the prior arts shall fall within the scope of protection of the present disclosure.

The invention claimed is:

1. A test system for an anchoring performance of a full-size rock mass anchor bolt under combined load, comprising: a primary frame, a co-directional pull-twist loading mechanism and a vertical shear loading mechanism, wherein the primary frame comprises a dual-parallel horizontal reaction frame and a vertical reaction frame disposed on the dual-parallel horizontal reaction frame; the co-directional pull-twist loading mechanism and the vertical shear loading mechanism are arranged in synergy with the primary frame; the co-directional pull-twist loading mechanism performs synchronous pull and twist loading for the anchored rock mass, the vertical shear loading mechanism applies a static load or simulates a dynamic load disturbance, and the co-directional pull-twist loading mechanism and the vertical shear loading mechanism perform separate loading;

the dual-parallel horizontal reaction frame comprises an outer side plate, an inner side plate, a front bearing plate, a rear bearing plate, a support base, and a ground cushion plate; the inner side plate and the outer side plate are arranged in parallel, with a mounting space reserved therebetween; the front bearing plate and the rear bearing plate are disposed at both ends of the inner side plate and the outer side plate respectively; the support base is fixed on the ground cushion plate;

the vertical reaction frame comprises an upper bearing plate, a reaction frame light bar, a lower bearing plate and a movement track; the movement track is fixedly disposed on the ground cushion plates and the vertical reaction frame moves along the movement track; the reaction frame light bars are disposed under the upper bearing plate and cooperatively mounted in the mounting space between the inner side plates and the outer side plates;

the co-directional pull-twist loading mechanism comprises a pull loading mechanism, a linkage mechanism, and a twist loading mechanism; the linkage mechanism is disposed between the twist loading mechanism and the pull loading mechanism; the pull loading mechanism comprises a horizontal pull-press oil cylinder, an oil cylinder fixing rod, a directional guide rod, a first guide plate, a wheel spoke sensor and an inner-thread screw hole connection disk; the twist loading mechanism comprises a twist motor, a motor fixing seat, a motor fixing frame, a first twist transmission shaft, a torque sensor, a second twist transmission shaft, a ball bearing, a slide block, a guide rail, a fixing giant plate and a fixing plate; the linkage mechanism comprises a double row cylindrical roller bearing, a second guide plate, a first belt wheel, a single-direction thrust ball bearing, a section-changing cylindrical rotary shaft, a thrust cylindrical roller bearing, a fixed shaft, a belt, a second belt wheel, a linkage frame and a connection sleeve;

the horizontal pull-press oil cylinder is a bidirectional loading oil cylinder; the horizontal pull-press oil cylinder is fixed on the front bearing plate by using the oil cylinder fixing rod; a round hole with a diameter greater than a piston diameter of the horizontal pull-press oil cylinder is reserved on the bearing plate; at a piston tail of the horizontal pull-press oil cylinder is a reduced thread screw rod in cooperation with the wheel spoke sensor; the wheel spoke sensor is fixedly connected to the first guide plate and the inner-thread screw hole connection disk by using a long thread stud; the first guide plate is provided with a drill hole with a diameter greater than the piston diameter of the horizontal pull-press oil cylinder; the wheel spoke sensor senses an axial pull force between the horizontal pull-press oil cylinder and the fixed shaft, and the inner-thread screw hole connection disk is fixed to a thread screw rod at a front end of the fixed shaft; the single-direction thrust ball bearing and the thrust cylindrical roller bearing are disposed inside an inner chamber formed by coupling a rear side of the inner-thread screw hole connection disk to a section-changing cylindrical rotary shaft by the fixed shaft; the double row cylindrical roller bearing is disposed inside an inner chamber formed by the section-changing cylindrical rotary shaft and the second guide plate, and the section-changing cylindrical rotary shaft rotates around the fixed shaft;

the first guide plate and the second guide plate are connected to the front bearing plate by the directional guide rod; the first belt wheel is mounted on the outer ring of the section-changing cylindrical rotary shaft, the twist motor drives the second belt wheel to rotate, and the belt is connected to the first belt wheel and the second belt wheel; the rotation of the first belt wheel brings the section-changing cylindrical rotary shaft and a pull-twist loading frame to rotate; the twist motor is mounted on the twist motor fixing frame by the motor fixing seat, and the twist motor fixing frame is fixedly mounted on the slide block of the fixing giant plate of the twist loading mechanism; the slide block is cooperated on the guide rail of the twist loading mechanism, and the fixing giant plate is connected with the inner side plates by a torque reaction plate;

the vertical shear loading mechanism comprises a vertical pull-press dynamic-static load oil cylinder, an oil cylinder fixing rod, a bladder-type energy accumulator, an oil cylinder communicating device, a vertical loading wheel spoke sensor, a connection disk, a loading column, and a loading plate; the bladder type energy accumulator is connected with the oil cylinder communicating device and the pull-press dynamic-static load oil cylinder; an oil cylinder piston of the pull-press dynamic-static load oil cylinder is fixedly connected to the vertical loading wheel spoke sensor, the connection disk, the loading column, and the loading plate sequentially.

2. The test system of claim 1, wherein the motor fixing seat is a hollow cylindrical structure through which the first twist transmission shaft runs to connect the rotary shaft of the twist motor; the first twist transmission shaft and the second twist transmission shaft both are connected with the torque sensor; the second twist transmission shaft is connected with the ball bearing and the second belt wheel, and the ball bearing is disposed on the slide block of the fixing giant plate by a bearing seat; the twist motor fixing frame is fixedly connected to the first guide plate and the second guide plate by the linkage mechanism; an upper part of the linkage mechanism is connected to a twist loading mechanism by a guide rail slide block mechanism; the twist loading mechanism moves in synchronization with an intermediate linkage mechanism and the pull loading mechanism by the linkage mechanism.

3. A test method for an anchoring performance of a full-size rock mass anchor bolt under combined load, using the test system of the anchoring performance of the full-size rock mass anchor bolt under combined load according to claim 1, and comprising:

when pull test is performed on the full-size anchor bolt, mounting the pull-twist hydraulic fixture and a fixing baffle plate of the anchor bolt pull-twist hydraulic fixture; applying a pull force by using the co-directional pull-twist loading mechanism to test pull parameters of the anchor bolt in the rock mass;

when pull-twist test is performed on the full-size anchor bolt, mounting the pull-twist hydraulic fixture and the fixing baffle plate of the anchor bolt pull-twist hydraulic fixture; applying a pull force and a twist force by using the co-directional pull-twist loading mechanism to test pull-twist parameters of the anchor bolt in the rock mass;

when pull-shear-twist test is performed on the full-size anchor bolt, applying a pull force and a twist force by using the co-directional pull-twist loading mechanism and applying a vertical shear load to any axial position of an anchor bolt body.

4. A test method for an anchoring performance of a full-size rock mass anchor bolt under combined load, using the test system of the anchoring performance of the full-size rock mass anchor bolt under combined load according to claim 1, and comprising:

performing test of separate performance of pull, twist and shear of a full-size anchor bolt or rod-like material; or, performing comprehensive mechanical performance test of pull, twist and shear on a full-size anchor bolt or rod-like material; or applying a coupled load of pull, twist and shear on a same fracture surface of a fractured anchored rock mass test sample; or, simulating a force received by the anchor bolt under the conditions of deformation of roadway side and fracture expansion;

wherein the anchored matrix test sample of the full-size anchor bolt is a sectionally-circular anchored rock mass test sample; and the fractured anchored rock mass test sample comprises multiple series-connected anchored matrix test samples.

\* \* \* \* \*